United States Patent [19]

Dean et al.

[11] Patent Number: 5,375,225
[45] Date of Patent: Dec. 20, 1994

[54] SYSTEM FOR EMULATING I/O DEVICE REQUESTS THROUGH STATUS WORD LOCATIONS CORRESPONDING TO RESPECTIVE DEVICE ADDRESSES HAVING READ/WRITE LOCATIONS AND STATUS INFORMATION

[75] Inventors: Edward A. Dean, Westford; Steven E. Golson, Carlisle; John F. McDonald, Leominster, all of Mass.

[73] Assignee: Sun Microsystems, Inc., Mountain View, Calif.

[21] Appl. No.: 815,245

[22] Filed: Dec. 31, 1991

[51] Int. Cl.$^5$ ............................................. G06F 15/16
[52] U.S. Cl. ..................................... 395/500; 395/250;
364/239.4; 364/239.7; 364/DIG. 1
[58] Field of Search ...................... 395/500, 575, 250

[56] References Cited

U.S. PATENT DOCUMENTS

| | | | |
|---|---|---|---|
| 4,031,517 | 6/1977 | Hirtle | 595/500 |
| 4,084,235 | 4/1978 | Hirtle et al. | 395/500 |
| 4,527,237 | 7/1985 | Frieder et al. | 395/200 |
| 4,937,036 | 6/1990 | Beard et al. | 340/706 |
| 4,947,366 | 8/1990 | Johnson | 395/500 |
| 4,954,942 | 9/1990 | Masuda et al. | 395/500 |
| 5,068,852 | 11/1991 | Locke | 371/16.2 |

OTHER PUBLICATIONS

P/C Chip Provides High Integration ... ; Mark Thorson; Oct. 16, 1991.
SPARC meets 386: Two Heads are Better ... ; Sun User Group; Jun., 1991.
"Use of a Coprocessor for Emulating the PC AT", John W. Irwin, *IBM RT Personal Computer Technology*, pp. 137–141, 1986.
"Coprocessor Software Support", Rajan Krishnamurty and Terry Mothersole, *IBM RT Personal Computer Technology*, pp. 142–146, 1986.

*Primary Examiner*—Thomas C. Lee
*Assistant Examiner*—Sang Hui Kim
*Attorney, Agent, or Firm*—Blakely Sokoloff Taylor & Zafman

[57] ABSTRACT

In the system of the present invention, a specialized form of read-ahead, write-behind buffering is provided which enables the host processing system to provide timely responses to device requests that are emulated by the host processor. Each input/output device request is identified by an address to which the device is purportedly mapped to. This address is translated to an address containing a status word for that particular device being emulated. Each status word contains a byte of information either to be sent to the microprocessor as a response during an I/O read operation request by the microprocessor, or to receive data written by the microprocessor in response to an I/O write operation request, and a plurality of status bits which identify the state of the data contained in the I/O status word. Thus, microprocessor I/O write operations may be quickly performed without the need for immediate response by the host processor and responses for various I/O devices emulated can be precomputed and input to the corresponding I/O status words such that when the microprocessor issues a read request to an input/output device the response may be quickly retrieved and returned back to microprocessor with little or no detected response time degradation.

18 Claims, 10 Drawing Sheets

| | RBS | RE | RM | RO | RI | WE | WM | WO | WI | NRAW | GNRW | GWO | |
|---|---|---|---|---|---|---|---|---|---|---|---|---|---|
| type 1. | 0 | 1 | 1 | 0 | 0 | 0 | 0 | 0 | 0 | 0 | 0 | 0 | data to be read over and over e.g. 8254 timer channel in "LSB only" read mode |
| type 2. | 0 | 1 | 0 | 1 | 1 | 0 | 0 | 0 | 0 | 0 | 0 | 0 | data to be read once and then must be updated e.g. 8254 timer in "MSB then LSB" mode |
| type 3. | 0 | 1 | 1 | 0 | 0 | 1 | 1 | 0 | 0 | 0 | 0 | 0 | allows unlimited reads and writes, reads get the last data written e.g. memory or 8259 |
| type 4. | 1 | 1 | 1 | 0 | 0 | 1 | 0 | 1 | 1 | 1 | 0 | 0 | allows only one write, then must update read data - unlimited reads until first write e.g. 8254 timer channel in "LSB only" mode, writing a new count value affects the read |
| type 5. | 1 | 1 | 1 | 0 | 0 | 1 | 0 | 1 | 1 | 0 | 1 | 1 | allows only one write, and the write may affect data and operations of other parts e.g. 8254 control register unlimited reads of predefined value |
| type 6. | 0 | 1 | 1 | 0 | 0 | 1 | 0 | 1 | 1 | 0 | 1 | 1 | similar to above, except you read back the last written data e.g. index register (in VGA) |

*Figure 5*

|  | RBS | RE | RM | RO | RI | WE | WM | WO | WI | NRAW | GNRW | GWO | IP | Read Byte | / | Write Byte |
|---|---|---|---|---|---|---|---|---|---|---|---|---|---|---|---|---|
| 3F8(THR/RBR) | 1 | 1 | 0 | 0 | 0 | 0 | 0 | 0 | 0 | 0 | 0 | 0 | 0 | Don't Care | / | Don't Care |
| 3F8(DLL)* | 0 | 1 | 0 | 0 | 0 | 1 | 0 | 1 | 1 | 0 | 0 | 0 | 0 |  | / | 0C |
| 3F9DLM* | 0 | 1 | 0 | 0 | 0 | 1 | 0 | 1 | 1 | 0 | 0 | 0 | 0 |  | / | 0C |
| 3F9(IER) | 0 | 1 | 0 | 0 | 0 | 1 | 1 | 0 | 0 | 0 | 0 | 0 | 0 |  | / | 0C [no interrupts pending] |
| 3FA(IIR) | 0 | 1 | 0 | 0 | 0 | 1 | 1 | 0 | 0 | 0 | 0 | 0 | 0 |  | / | 0C [no interrupts pending] |
| 3FB(LCR) | 0 | 1 | 0 | 0 | 0 | 0 | 0 | 0 | 0 | 0 | 0 | 0 | 0 |  | / | 1A [even parity, 7 bits, 1 stop bit, set break disabled, parity is logic 0] |
| 3FC(MCR) | 0 | 1 | 0 | 0 | 0 | 0 | 0 | 0 | 0 | 0 | 0 | 0 | 0 |  | / | 0C |
| 3FD(LSR) | 1 | 1 | 0 | 1 | 1 | 0 | 0 | 0 | 0 | 0 | 0 | 0 | 0 | 40 | / | Don't Care [Jxt Rx Buffers empty, no errors] |
| 3FE(MSR) | 1 | 1 | 0 | 1 | 1 | 1 | 1 | 0 | 0 | 0 | 0 | 0 | 0 | external communication start | / | Don't Care |

* Not Active as DLAB = 1

*Figure 7b*

SYSTEM FOR EMULATING I/O DEVICE REQUESTS THROUGH STATUS WORD LOCATIONS CORRESPONDING TO RESPECTIVE DEVICE ADDRESSES HAVING READ/WRITE LOCATIONS AND STATUS INFORMATION

BACKGROUND OF THE INVENTION

1. Field of the Invention

The present invention relates to the field of emulation of hardware devices, more particularly the present invention relates to the emulation of input/output devices for a processor wherein the emulation is provided by the host processor to which the processor is connected to.

2. Background of the Invention

Processors and computer systems exist in a wide variety of sizes and capabilities. One popular type of computer system is referred to as a personal computer such as the IBM PC ® and IBM PC/AT ® (manufactured by IBM Corporation, Armonk, N.Y.), (IBM PC and IBM PC/AT are registered trademarks of International Business Machines Corporation) and compatibles such as that manufactured by Compaq Computers, Houston, Tex. Due to the popularity and widespread use of personal computers, a wide variety of software is available to run on personal computers however, personal computers are limited in their capability and functions and often users may find the need for a more powerful computer system. The type of computer system often referred to as a "workstation", is being used to fill that need. An example of computer workstations are those manufactured by Sun Microsystems Inc, Mountain View, Calif. However, due to the fact that the workstation typically uses a different processor then the PC as well as a different operating system and internal architecture, the applications written for the personal computers will not run on a workstation.

Some users have discovered the need to have the ability to run personal computer applications while maintaining the power of the workstation when necessary for other applications. Thus it is desirable to provide a single computer system that can run as a workstation as well as a personal computer. One method to do this is to emulate the operation of a personal computer on the workstation. However, this is achieved entirely through software and is extremely slow and quite burdensome to operate.

Another option is to provide the processor of the personal computer as a component of the workstation wherein the processor can operate its own operating system and execute processes and procedures as if it were operating in a stand alone personal computer. The workstation processor acts as the host processor and provides any peripheral support that the personal computer processor requires. Although an improvement over emulation, it is still quite slow in response and computationally intensive because each time the microprocessor, that is, the microprocessor or the "personal computer,", attempts to communicate with a peripheral device, the communication is sent to the host processor which must then interpret the communication and determine what kind of response is required. For example, if the process executing on the microprocessor attempts to write to an I/O device such as a disk drive, the host processor must provide the emulation of the disk drive because the microprocessor does not have a disk drive but rather utilizes the disk drive of the host computer system (e.g., workstation). As the host processor receives the request by the microprocessor to write information to the disk drive, it sends back the proper acknowledgement to the microprocessor and stores the information appropriately in its own disk drive. However, this process is also quite time consuming because the workstation processor must intercept the request, determine what device the request is directed to and determine what the proper response to the request should be in order to send back a response to the microprocessor.

SUMMARY OF THE INVENTION

It is therefore an object of the present invention to provide an I/O emulation device that operates in a timely manner.

It is further an object of the present invention to provide a system in which the host processor provide input/output device emulation to a second processor in the system with little or no degradation in operation.

In the system of the present invention, a specialized form of read-ahead, write-behind buffering is provided which enables the host processing system to provide timely responses to device requests that are emulated by the host processor. Each input/output device request is identified by an address to which the device is purportedly mapped to. This address is translated to an address containing a status word for that particular device being emulated. Each status word contains a byte of information either to be sent to the microprocessor as a response during an I/O read operation request by the microprocessor, or to receive data written by the microprocessor in response to an I/O write operation request, and a plurality of status bits which identify the state of the data contained in the I/O status word. Thus, microprocessor I/O write operations may be quickly performed without the need for immediate response by the host processor and responses for various I/O devices emulated can be precomputed and input to the corresponding I/O status words such that when the microprocessor issues a read request to an input/output device the response may be quickly retrieved and returned back to the microprocessor with little or no detected response time degradation.

BRIEF DESCRIPTION OF THE DRAWINGS

The objects features and advantages of the present invention will be apparent from the following detailed description in which:

FIG. 5 is a table illustrating some exemplary emulation states of an Intel 8254 timer.

FIG. 7a, 7b and 7c illustrate a simple emulation of an I/O communications port.

DETAILED DESCRIPTION OF THE INVENTION

The present invention will be described in terms of the preferred embodiment in which a microprocessor, such as that used in workstations, provides I/O device emulation to a microprocessor such as those found in personal computers. However the invention is not limited to that structure and pertains to any multiprocessor system in which a first processor acting as the host, provides device emulation to a second processor connected to the first processor.

Figure 1A:
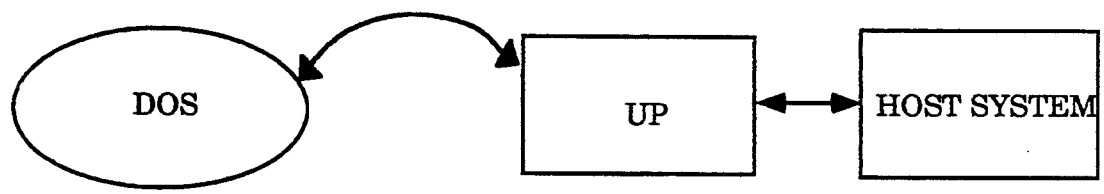
FIGS. 1a, 1b and 1c illustrate an exemplary computer system applying the present invention.

As illustrated in FIG. 1a, an application written for the Microsoft MS-DOS operating system which is executed on a microprocessor such as the 80386 or 80486, manufactured by Intel Corporation, Santa Clara, Calif., may perform operations that require use of input/output devices that in the configuration, do not exist as connected directly to the microprocessor. In such instances, the host system provides the necessary emulation support to the microprocessor, such that the microprocessor functions as if the devices were contacted directly to it.

Figure 1B:
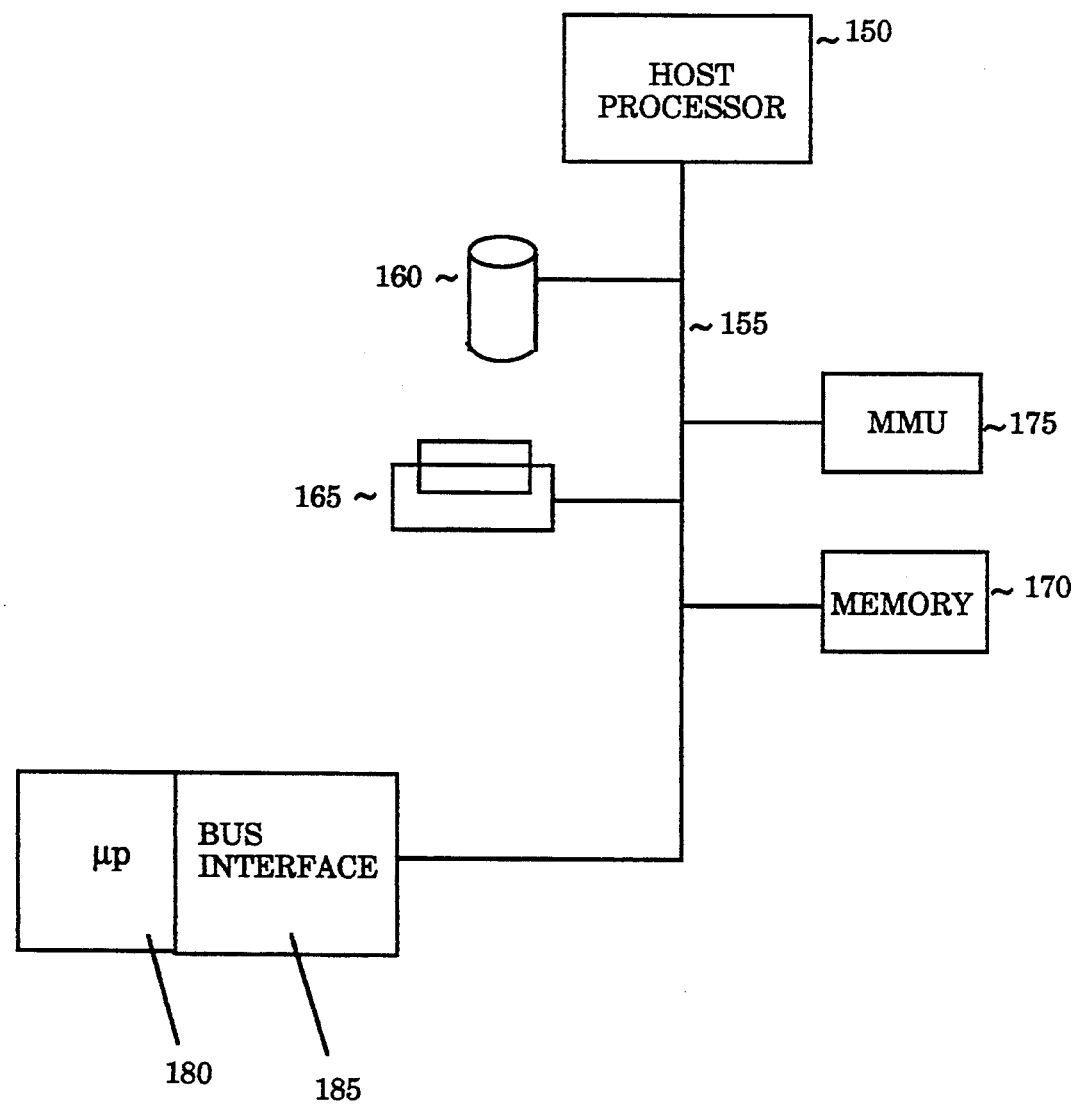

FIG. 1b illustrates a exemplary system. The host processor 150 is preferably a 32 bit processor such as the SPARC TM processor (SPARC is a trademark of Sparc International), manufactured by Cypress Semiconductor, San Jose, Calif., or a similar 32 bit processor. The processor is connected to a variety of devices along the bus 155, including disk drives 160 printer devices 165 and memory 170. Memory management unit 175 is connected to the bus to control the utilization of memory 170.

The microprocessor is connected to the bus through the bus interface 185. The bus interface 185 intelligently interfaces the microprocessor to the bus to couple the microprocessor to the host processor and the memory in order to provide I/O emulation in accordance with the present invention. The bus interface determines when to notify the host processor of I/O requests by the microprocessor, when to access the memory for status information and the process steps to perform based upon the status information.

The bus interface contains a means for reading the address, data and control information output by the microprocessor, respectively through the address, data and bus control lines, means for writing data and control information to the microprocessor and logic for controlling the input/output data flow to the microprocessor to support I/O emulation.

Figure 1C:
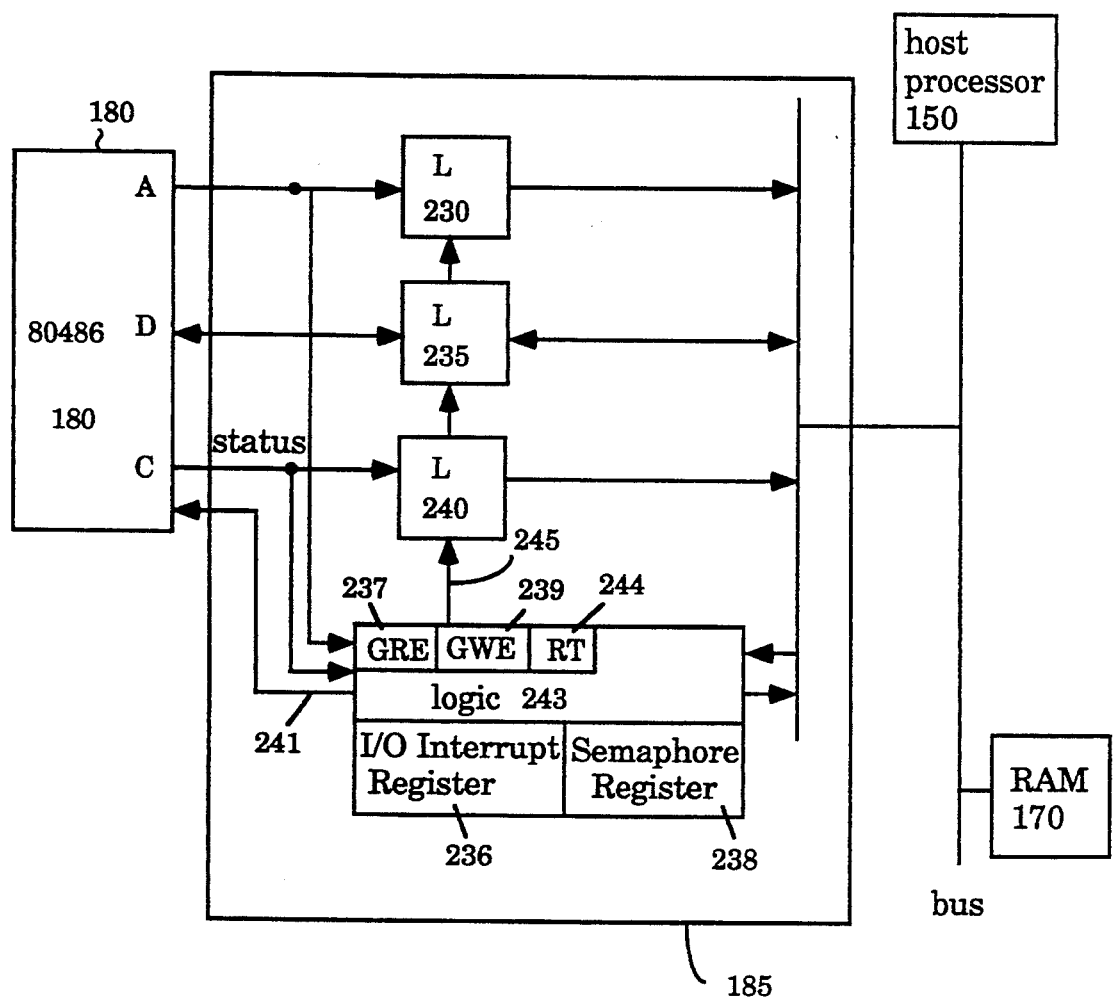

Preferably the bus interface 185, referring to FIG. 1c, comprises three sets of latches, one set 230 connected to the address lines, one set 235 connected to the data lines and one set 240 connected to the bus control lines. The latches are controlled by the bus interface logic 243 through control line 245, and are utilized to capture the address, data and control information output by the microprocessor 180 during an I/O operation, as well as to temporarily store data to be sent to the microprocessor during an I/O read operation. Furthermore, it is preferred that the bus interface 185 includes a global write enable bit (GWE) 239 and global read enable bit (GRE) 237 which are accessible by the host processor 150 to globally enable and disable I/O read and write operations.

The bus interface also provides control signals 241 to the microprocessor in response to an I/O request. These control signals are specific for the: 486 and are described in the "Intel I486 Microprocessor Data Sheet," November 1989, Intel Corporation, Santa Clara, Calif. Other processors will, of course, have similar but different control signals which also can be provided by the bus interface.

The ready input control signal (RDY) indicates that the current bus cycle is complete. The burst ready input control signal BRDY indicates that the current bus cycle, which is a burst operation, is complete. The back-off input signal (BOFF) tells the microprocessor to abort the current bus cycle and release control of the bus. Preferably, the processor will remain off the bus until BOFF is de-asserted. Once BOFF is de-asserted, the microprocessor will attempt to restart the bus cycle aborted when BOFF was asserted. As will be explained subsequently, the logic 243 will utilize these control signals to indicate to the microprocessor to execute an instruction and then trap (stop executing) to enable the bus interface and/or host processor to perform certain tasks before the microprocessor continues processing, i.e., executing instructions.

A portion of memory 170 is utilized for storage of the I/O status block used for device emulation. The I/O status block is referenced and updated by the bus interface and host processor to maintain the status of emulation for each device emulated. Each device emulated by the system is identified by one or more addresses, each address corresponding to a port of the device. An I/O status word for each address is contained in the I/O status block. Each I/O status word stores basic reed and write information used to control the I/O emulation of a device. In particular, each I/O status word stores data to be sent to the microprocessor during a read operation, stores data the microprocessor outputs during a write operation, and I/O control bits which identify elementary I/O control functions. Through the use of the I/O control bits in the I/O status word, the need for the microprocessor to wait for the host processor emulation to respond to each I/O request is eliminated thereby permitting the microprocessor to continue processing (i.e., execute the next instruction) while the host processor updates the state of device emulation pursuant to the I/O request.

The host processor, based upon the state of emulation of an emulated device, writes data to the I/O status word at an address which corresponds to the address of the emulated device and sets the appropriate I/O control bits. The data written to the I/O status word is that which the host determines will be the next data the microprocessor should read from that address. This determination is made using well known device emulation techniques for emulating the state of an I/O device and by carefully reviewing the device specification to determine the precise operation of the device and the data input and output during certain device operations. When the microprocessor requests an I/O read operation with respect to a particular device, the read operation is quickly and easily performed by supplying the data stored in the I/O status word. Therefore, the time which would be required for the host processor to receive the I/O read request, process the request to determine the data requested and supply the data to the microprocessor is eliminated. Similarly, when an I/O write operation is to be performed, the data to be written is written directly into the I/O status word enabling the microprocessor to immediately continue processing. The host processor is subsequently notified of the data stored in the I/O status word, reads the data and updates the state of emulation of the I/O device while the microprocessor continues processing.

Figure 2:
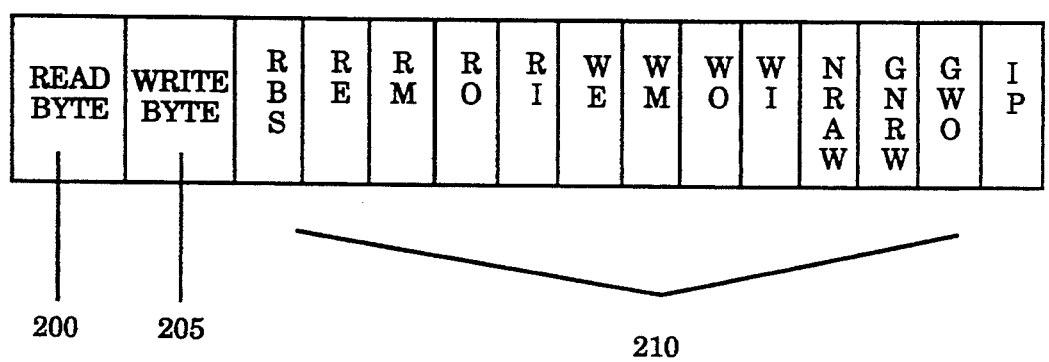
FIG. 2 illustrates a preferred embodiment of an I/O status word for an emulated I/O device.

A preferred embodiment of an I/O status word is illustrated in FIG. 2. The I/O status word contains an area, read byte 200, for storage of a byte of data to be returned to the microprocessor in response to a request for a read I/O operation. Write byte 205 is utilized to store a byte of data received from the microprocessor during a write I/O operation. The write byte optionally provides data to be read by the microprocessor during an I/O read operation. Status bits 210 provide the status of the data contained in the I/O status word as well as control information indicating how to respond to the I/O request issued by the microprocessor. Preferably the status bits are defined as follows:

- RBS: Read Byte Select. When set, this bit indicates that I/O read operations should access the data stored in the Read Byte. When cleared, I/O read operations should access the data in the Write Byte. This allows I/O read operations by the microprocessor to immediately access correct data following an I/O write operation, thereby eliminating the delay required for the host processor to update the Read Byte with the data just written to the Write Byte.
- RE: Read Enable. Provides for read enable/disable. When this bit is set, I/O read operations are permitted to occur only when either the RM bit or RO bit is also set, otherwise a cycle fault occurs.
- RM: Read Many. When this bit is set (and the RE bit is set), unlimited I/O mad operations are permitted to occur.
- Read Once. When this bit is set (and the RE bit is set), the first I/O read operation to the I/O port is allowed to complete, and the RO bit is then cleared by the bus interface. This prevents subsequent read operations to this address from occurring until the host processor provides an update.
- RI: Read Interrupt. When this bit is set, a host processor interrupt is generated when a read operation is performed.
- WE: Write Enable. This bit provides for write enable/disable. When this bit is set, I/O write operations are permitted to occur only when either the WM bit or WO bit is also set, otherwise a cycle fault occurs.
- WM: Write Many. When this bit is set, (and the WE bit is set), unlimited I/O write operations are permitted to occur.
- WO: Write Once. When this bit is set (and the WE bit is set), the first I/O write operation to the I/O port is allowed to occur, and the WO bit is then cleared by the bus interface. This prevents subsequent write operations at this address from occurring until the host processor provides an update.
- WI: Write Interrupt. When this bit is set, a host processor interrupt is generated when a write operation occurs.
- NRAW: No Read After Write. After this bit is set, the first I/O write operation to the I/O port is allowed to complete, and the RE bit is then cleared. This prevents subsequent read operations at that address from occurring until the host processor provides an update.
- GNRW: Global No Read After Write. After this bit is set, the first I/O write operation to an I/O port is allowed to complete, and the GRE bit 237 located in the bus interface 185 is then cleared. This prevents subsequent reads from any I/O port from occurring until host software provides an update. Typically this is used when a write operation affects the state of emulation of more than one I/O port address, and therefore more than one I/O status word, and the host processor is required to update the I/O status words. For example, this bit is used for index registers which, when modified, affect the operation of other I/O ports in a device.
- GWO: Global Write Once. When this bit is set, the first I/O write operation to an I/O port is allowed to complete, and the GWE bit 239 in the bus interface 185 is then cleared. This prevents subsequent write operations to any I/O port from occurring until host software provides an update. This may also be used for index registers which, when modified, affect the operation of other I/O ports for a device.
- IP: Interrupt Pending. It is also preferred to provide one additional bit to the I/O status word. To further expedite the host interrupt process, the Interrupt Pending bit is respectively set by the bus interface when the RI or WI bits are set and the interrupt is issued to the host processor. At the time the interrupt is issued to the host processor, the IP bit is set. When the host processor subsequently services the interrupt, the host will read the IP bit of the I/O status words to determine if it is set. The I/O status word having the IP bit set is the I/O status word to be updated by the host.

It is preferred that three additional I/O status word formats may be utilized to provide additional functionality and flexibility to the bus interface. An I/O indirect format comprises an I/O port address and is used to alias one port address onto another. For example, on the IBM PC/AT system, port 0×40 and 0×44 both refer to the same register in the 8254 timer. The I/O status word for port 0×44 can be set to indirectly refer to port 0×40, thus ensuing correct emulation. A virtual indirect format contains the virtual address of a device to be accessed. This virtual address is output to the bus to access a device connected to the bus. This format may be used, for example, to access additional emulation devices coupled to the bus.

The I/O index format is used for I/O ports that use the contents of another port as an index. The I/O index format is similar to the I/O indirect format but additionally specifies an index map. The I/O port address specified indicates which I/O port address contains the index. Therefore, when an I/O status word in the I/O index format is encountered, the bus interface first fetches the I/O status word corresponding to the port address containing the index (as is done when an indirect format I/O status word is encountered). The write byte of the fetched I/O status word (the fetched I/O status word is in direct format) is used in conjunction with the Index Map to generate a third I/O status word address. The third I/O status word is then fetched. The third I/O status word is in direct format and is used to perform the emulation. Therefore, using this format, for any given I/O port address, them are a number of direct format I/O status words (depending on the number of bits representing the index) which are addressed based on the contents of the indexed port status word. The index map field allows multiple indexed ports to each have their own subset I/O status block.

Figure 3A:
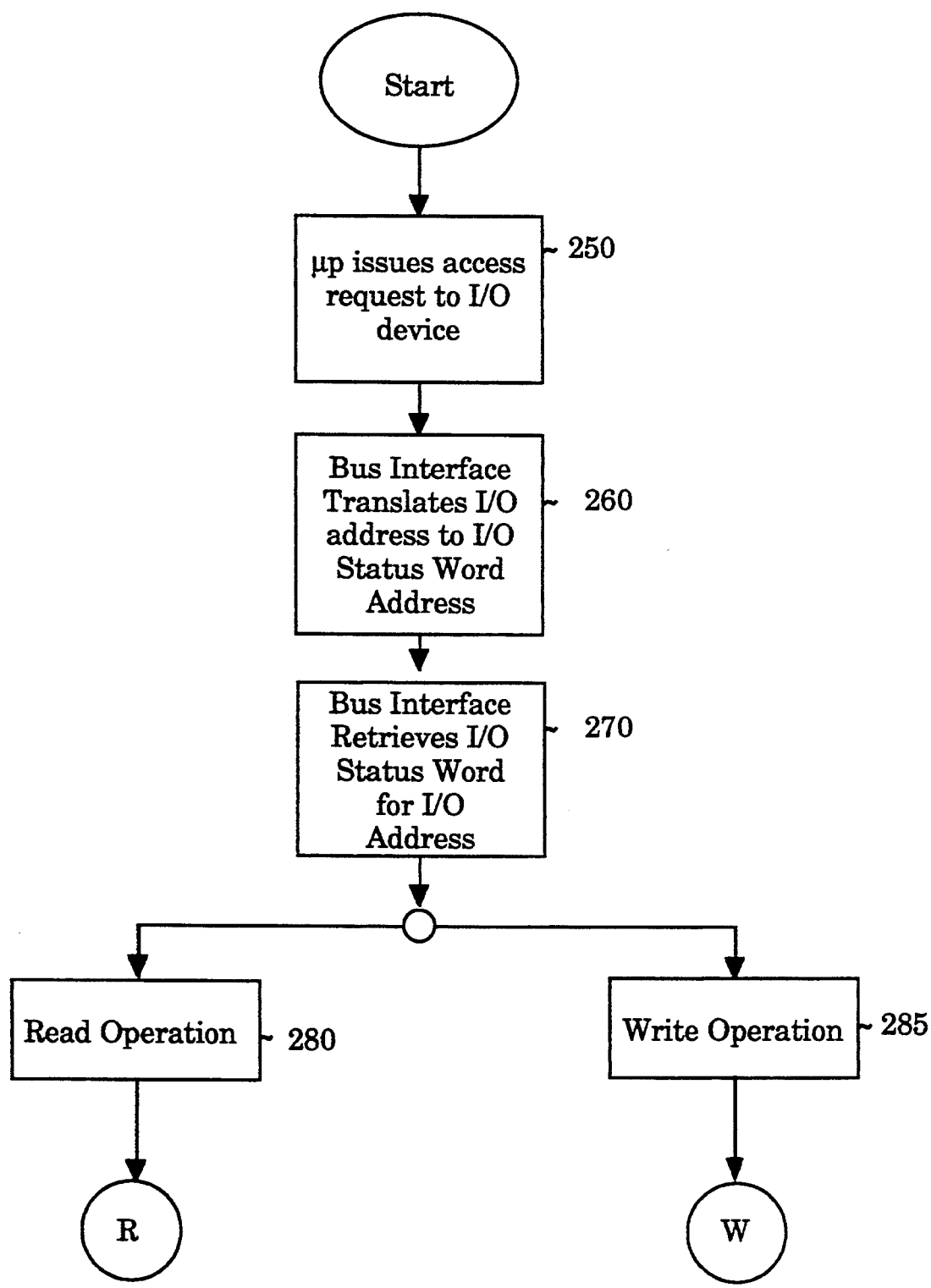
FIGS. 3a, 3b and 3c are flowcharts which illustrate the process used for providing input/output device emulation with little or no time degradation.
Figures 3B, 3C:
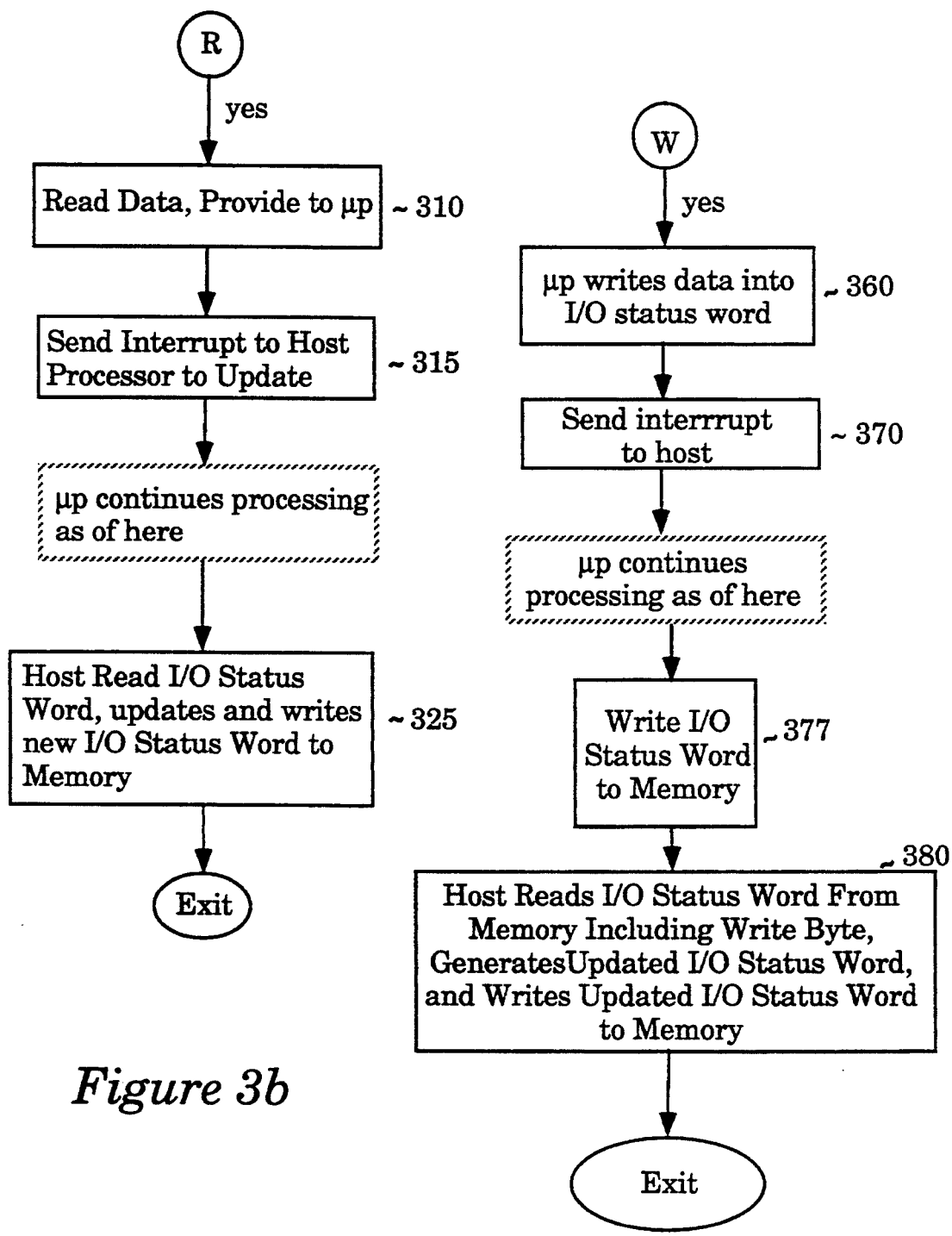

An illustrative process is illustrated by the flowcharts of FIGS. 3a, 3b and 3c. This is a simple emulation process in which data may be read from or written to a single time after which the host processor must be interrupted to update the state of emulation and the I/O status word. Referring to FIG. 3a, block 250, the microprocessor issues an access request to an I/O device by identifying the I/O device address. At block 260, the bus interface unit translates the I/O address to the I/O status word address and, at block 270, retrieves the I/O status word for that particular I/O address from memory. If the request from the microprocessor is a read operation, referring to FIG. 3b, at block 310 the data is read from the I/O status word and sent to the microprocessor in response to its request. The microprocessor immediately continues processing because the I/O operation has been completed. An interrupt is sent to the host processor block 315, to update the state of emulation and retrieve the I/O status word from memory. At block 325, the host processor is interrupted retrieves the I/O status word, updates the state of emulation and writes a new I/O status word into memory.

If, at block 285, a write operation is to occur pursuant to the I/O request issued by the microprocessor, at block 360 FIG. 3c, the data to be written is placed in the Write Byte in I/O status word. The microprocessor is then able to continue processing while, at block 370, the host processor is interrupted by the bus interface to retrieve the written data from the I/O status word to update the corresponding device or memory location providing the emulation of the I/O device. The host processor reads the I/O status word, generates an updated I/O status word, block 380, and writes the I/O status word back into memory.

Preferably, an I/O interrupt status register 236 is provided in the bus interface 185 (FIG. 1c) to expedite the time required for the host processor to update the I/O status word. The bus interface will set one of the bits in the I/O interrupt status register dependent upon the I/O address. The bit identifies the area of memory where the I/O status word to be updated is located. This reduces the amount of time the host processor expends searching memory for the correct I/O status word to update. Thus, upon receipt of an interrupt from the bus interface, the host will read the I/O interrupt status register to determine the area of memory the I/O status word is located and once the I/O status word is located, update the state of emulation and therefore the I/O status word.

Furthermore, it is preferred to include an I/O semaphore register 238 in the bus interface to trap all I/O bus cycles issued by the microprocessor during the period the host processor is updating the state of emulation and the I/O status word. This semaphore causes the bus interface to trap all I/O bus cycles while permitting the microprocessor to continue other processing. The semaphore is set only during the actual updating of I/O status words by the host processor (and not for the entire time the interrupt is pending) so the degradation in processing speed is minimal. The semaphore cannot be set while the bus interface is accessing the I/O status word. The semaphore register is reset by the host processor after the update of the I/O status word is complete. After the semaphore is reset, any I/O bus cycle that had been trapped is allowed to complete.

The steps taken by the host processor at a particular state of emulation in response to a particular I/O request by the microprocessor determines the read value placed in the read byte as well as the settings of the status bits in each I/O status word. The emulation states required and the updates provided to the I/O status word by the host processor in response to an I/O operation are derived from the operation of the emulated device itself as determined from observation of device operation and specifications provided in the manufacturer's specification manual.

For ease of explanation, a simple I/O device emulation, a limited emulation of an Intel Corporation 8254 timer for operation with an 80486 microprocessor, will be described. However, it will be obvious to one skilled in the art that the techniques set forth herein are applicable to emulate a variety of I/O devices with a variety of microprocessors.

Figure 4:
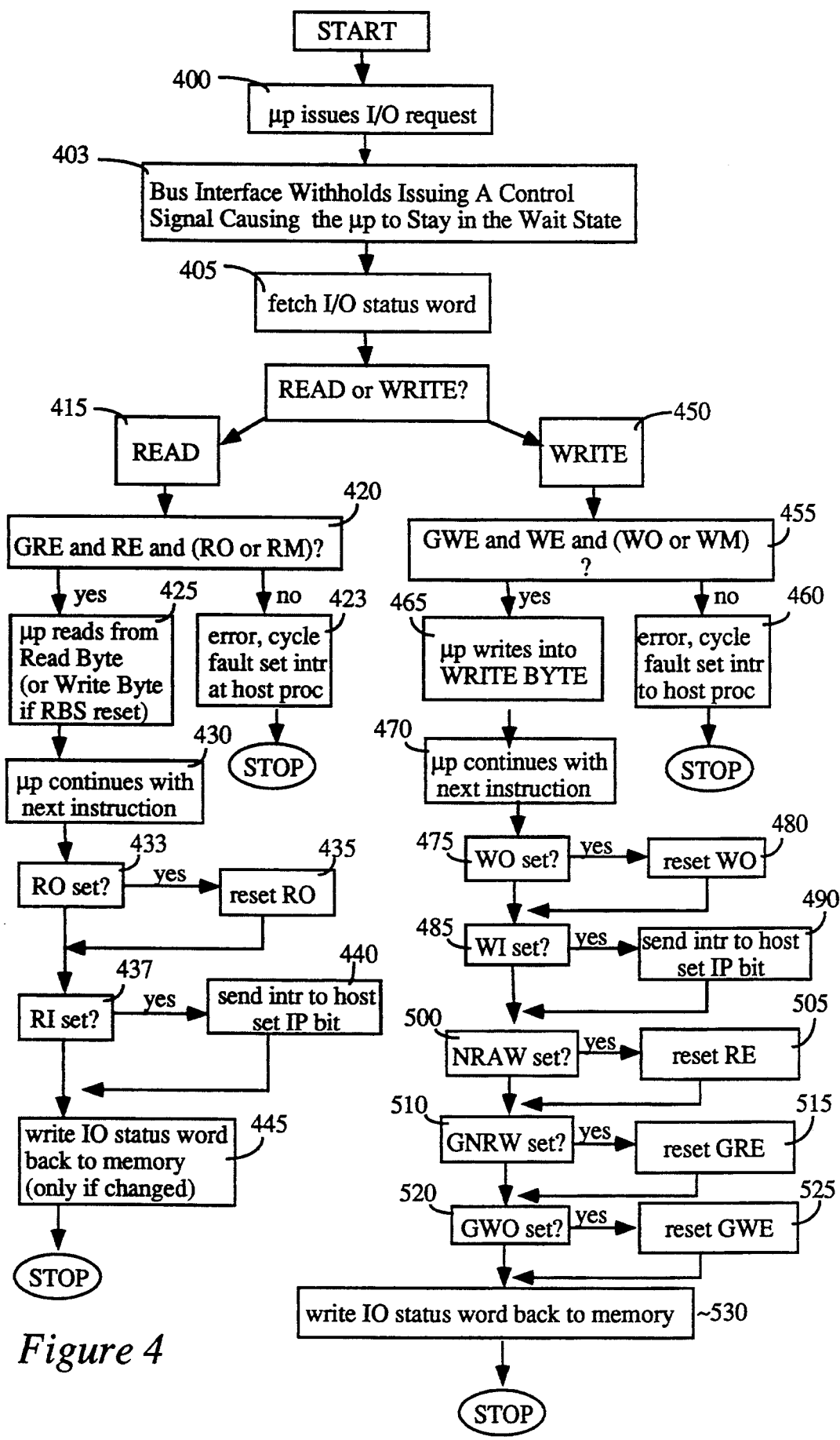
FIG. 4 is a flowchart illustrating a simple emulation of an Intel 8254 timer.

FIG. 4 sets forth the process flow for performing device emulation in accordance with the system of the present invention. At block 400, the microprocessor issues an I/O request. In response, the bus interface withholds issuing a control signal to the microprocessor, thereby forcing the microprocessor, block 403, into a wait state. At block 405, the bus interface determines the I/O status word address which corresponds to the address of the I/O request and reads the corresponding I/O status word stored in the RAM 170. If the operation to be performed is a read operation, block 415, the status bits, Global Read Enable (GRE) and Read Enable (RE) and either Read Once (RO) or Read Many (RM) are checked, block 420, to determine if the bits are set. If these bits are not set, an error occurs because without the GRE, RE and RO or RM bits set, a read operation cannot be executed. Upon generation of an error, a cycle fault occurs in the microprocessor by asserting the BOFF control signal. The BOFF control signal causes the current bus cycle to be aborted and microprocessor activity to be suspended until the BOFF is de-asserted. Once BOFF is de-asserted, the microprocessor will attempt to retry the bus cycle previously aborted. Furthermore, upon generation of an error, an interrupt is generated at the host processor, block 423, for the host processor to review the state of emulation and update the I/O status word as necessary. The combination of causing a cycle fault in the microprocessor and issuing an interrupt to the host permits the microprocessor to re-execute the bus cycle after the host updates the I/O status word to remove the error.

Alternatively, or if a retry of an aborted cycle will cause another cycle fault, the host processor can cause the microprocessor to complete the bus cycle by setting the run/trap bit 244 in the bus interface. A run/trap bit 244 is provided in the bus interface. If this bit is set and the microprocessor operation is suspended due to a cycle fault (caused by issuance of the BOFF control signal), when the bus cycle is retried, the microprocessor will complete its mad cycle by reading data from the data error register located on the bus interface and previously written by the host microprocessor. Similarly, the microprocessor will complete a write cycle by writing to the data error register. The data error register may then be read by the host processor. The run/trap bit is cleared after the retry is completed.

The run/trap feature works by inhibiting the fault from being recognized on the retry. This feature may also be utilized to input data to the microprocessor. For example, when the processor come out of reset, if it is desirable to provide start-up code from a different memory location, then that memory location can be utilized to cause the microprocessor to read from a different memory address. A second bit, trap all cycles, is preferably provided in the bus interface, that, when set causes all microprocessor bus cycles to fault. When the run/-trap and trap all cycles bits are set, the retry of the bus operation will be completed using the data error register. Thus, a set run/trap bit will override the trap all bit, the fault will not occur and the bus operation will complete. The run/trap bit is cleared after the retry is complete and the following cycle will fault because the trap all bit is still asserted. Single step operation is achieved with each cycle completed in turn using data from the data error register. Once the run/trap and trap all cycles bits are cleared, the microprocessor continues normal operation.

Continuing reference to FIG. 4, if the GRE, RE and (RO or RM) bits are set, at block 425, the microprocessor retrieves data from the Read Byte in the I/O status word, immediately accessing the information requested and immediately continues on with processing by executing the next instruction, block 430. It should be noted that if the RBS bit is reset, the microprocessor would read from the Write Byte instead of the Read Byte. This is frequently used in the situation where the microprocessor immediately reads back data written to an I/O port. The microprocessor simply reads back from the Write Byte, thereby eliminating the delay caused by waiting for the host to update the Read Byte with the data located in the Write Byte.

As the microprocessor continues processing, the bus interface determines, block 433, whether the Read Once (RO) bit is set. If the RO bit is set, block 435, the bit is reset to indicate that a read operation has been performed and a second read operation cannot be performed without the host processor intervening to update the I/O status word. The bus interface then determines, block 437, whether the RI (Read Interrupt) bit is set. If the RI bit is set, an interrupt is generated at the host processor, block 440 and the IP bit is set. If the I/O status word has been modified, the I/O status word is then written back into memory, block 445, thereby completing the emulation cycle for the microprocessor I/O operation. The host processor will review the I/O status word and execute the emulation code based upon the status word to update the state of emulation of the I/O port device and the I/O status word.

If a write operation is to be performed, block 450, the bus interface determines whether the Global Write Enable (GWE) and Write Enable (WE) and the Write Once (WO) or Write Many (WM) bits are set, block 455. If the GWE and WE and (WO or WM) bits are not all set, an error occurs, the microprocessor is issued a BOFF control signal to abort the current bus cycle and suspend operation of the microprocessor, and an interrupt is sent to the host processor to update the status of emulation, block 460, and the I/O status word. Once the host has corrected the error condition by updating the I/O status word, the BOFF control signal is de-asserted and the microprocessor re-initiates execution of the aborted bus cycle. Alternatively, the cycle could be forced to complete by use of the run/trap bit and data error register as described previously. If the GWE, WE and (WO or WM) bits are set, the microprocessor writes the data into the Write Byte of the I/O status word, block 465, and continues with processing the next instruction, block 470.

As the microprocessor continues processing, the bus interface examines the I/O status word. If the Write Once (WO) bit is set, block 475, the WO bit is reset by the bus interface, block 480, to indicate that data has been written into the I/O status word and no additional data may be written to the I/O status word until it is read by the host processor and cleared from the I/O status word. If the Write Interrupt (WI) bit is set, block 485, the IP bit is set and an interrupt is sent, block 490, to the host processor.

If, at block 500, the NRAW bit is set (No Read After Write), the Read Enable (RE) bit is reset by the bus interface thereby preventing subsequent reads after the write. At block 510, if the GNRW (Global No Read After Write) bit is set, at block 515 the GRE (Global Read Enable) bit 237 in the bus interface is reset by the bus interface thereby preventing any read operations to be performed with respect to any I/O port devices emulated until the GRE bit is set by the host processor after emulation state updates are performed. Similarly, at block 520, if the GWO (Global Write Once) bit is set, the GWE (Global Write Enable) bit 239 in the bus interface is reset by the bus interface, block 525, thereby preventing any subsequent writes until the GWE bit is subsequently set. At block 530, the revised I/O status word is written back to memory for subsequent access as needed. If an interrupt was sent to the host processor, the host processor responds to the interrupt by reading the I/O status word, examining the state of emulation, updating the I/O status word and state of emulation accordingly and writing the updated status word into memory.

The emulation code executed by the host processor is similar to that known to those skilled in the art for performing software emulation of I/O devices. However, the code differs as the host processor interacts and communicates with the microprocessor through the I/O status word, reviews the status bits in the I/O status word and updates the status bits of the I/O status word depending upon the state of emulation reflected in the I/O status word. For example, if the data placed in the read byte is a value which can be read repetitively, the read many (RM) status bit will be set to indicate that status. Similarly, if data is output from the microprocessor, this data is output to the write byte of the corresponding I/O status word. The host will read the write byte to extract the data and update the read byte and status bits to reflect a state of emulation in which the data output by the microprocessor was received by the I/O device.

FIG. 5 is illustrative of some of the different emulation states that may exist in an 8254 timer emulation. Type 1, in which the RE and RM bits are set, provides the emulation state in which data can be read repeatedly. This state may be used, for example, when a timer channel in the 8254 timer is in the "LSB only" read mode in which the least significant byte of the timer is read repeatedly. Type 2, in which the RE, RO and RI bits are set, indicates the state of MSB then LSB mode in which the most significant byte to be first read, followed by the least significant byte. The RI bit is set to interrupt the host processor to update the read byte with the MSB and LSB, respectively. The type 3 I/O status word, in which the RE, RM, WE, WM bits are set, allows unlimited read and write operations to be performed wherein the read operations read the last data written to the I/O status word. The type 4 status word, has the RBS, RE, RM, WE, WO, WI and NRAW bits set. The RE and RM bits are set to provide unlimited read operations. The WO, WI and NRAW bits are set to permit a single write after which no read operations are performed until the host processor is interrupted and the state of emulation for the affected I/O ports are updated. An example of a type 4 operation is the 8254 timer channel operating in the LSB only mode and a write operation is performed to modify the count value of the channel. The modified count value modifies the value to be read and therefore an update is required by the host processor. In Type 5, the RBS, RE, RM, WE, WO, WI, GNRW and GWO bits are set to permit only one write operation to be performed before an update of the state of emulation of the I/O port device by the host processor. In this instance the write operation may affect the data and operations of other ports of the 8254 timer chip, for example, the 8254 control register. Therefore, the GWO bit is set as well as the WI bit such that no further write operations are permitted at any of the I/O port devices until the host processor is interrupted to evaluate the state of emulation and update emulation states where necessary. In Type 6, the control word bits, RE, RM, WE, WO, WI, GNRW and GWO are set such that only one write operation is permitted, and read operations read back the last data written.

Figure 6:
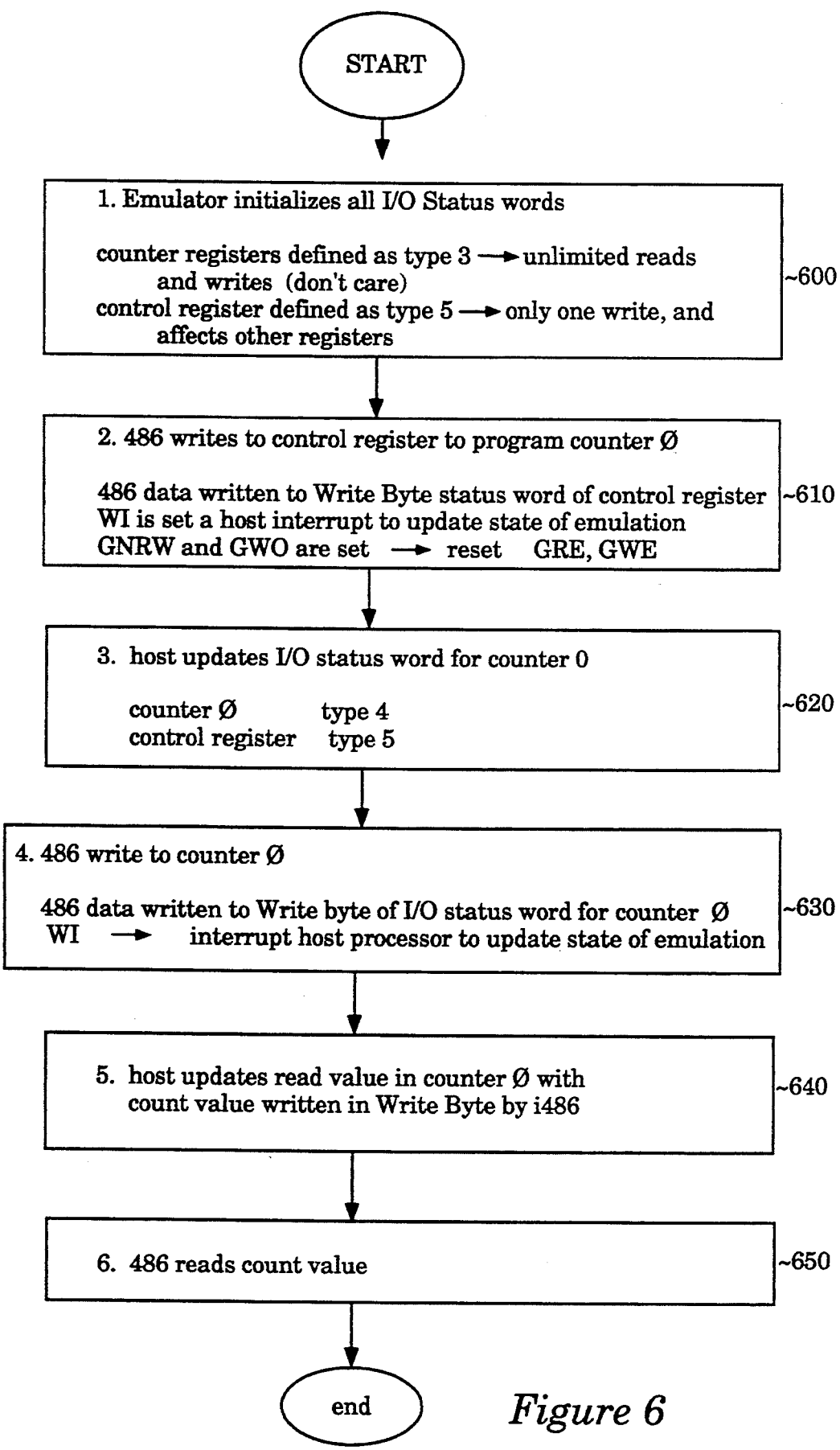
FIG. 6 illustrates an exemplary use of the emulation states set forth in FIG. 5 to provide emulation of an Intel 8254 timer.

With reference to FIG. 6, an illustrative portion of emulation code for the 8254 timer is discussed. At step 1, block 600, the host processor initializes the I/O status words for the I/O ports of the timer. The I/O status words corresponding to the counters in the 8254 timer are initially set to a "don't care" state which permits unlimited reads and writes (Type 3, FIG. 5). The control register for the 8254 is set similar to Type 5, FIG. 5, in which only one write is permitted before the host processor is required to update the status of the I/O status word as well as other I/O status words, i.e. the counters, which may be affected by the write operation. At step 2, block 610, the microprocessor generates an I/O request to write to the control word in order to program counter zero. The data to be written is written into the Write Byte of the I/O status word corresponding to the control register. As the WI bit is set in the control register, a host processor interrupt is generated to inform the host processor to update the status of the control register and counter 0. GNRW is set such that GRE and GWE are reset to prevent any subsequent reads and writes until the update is complete by the host processor.

At box 3, block 620, the host processor updates the I/O status word for the counter zero, setting it to a state similar to Type 4 of FIG. 5. Thus, when the microprocessor subsequently writes to counter 0, block 630, the data is written to the I/O control word for counter 0 and an interrupt at the host processor is generated (WI bit is set). The host processor examines the I/O status word, block 640, and updates the read byte of the I/O status word corresponding to counter zero to reflect the count value written by the microprocessor at block 630. The I/O status word is then updated. The data written into the write byte of the I/O status word at block 630 is written by the host processor into the read byte and the status bits are set such that they reflect the state as in Type 4 of FIG. 5 which permits unlimited read operations but only one write operation. At block 650, the microprocessor can then read the count value from the read byte immediately and continue processing.

Figure 7A:
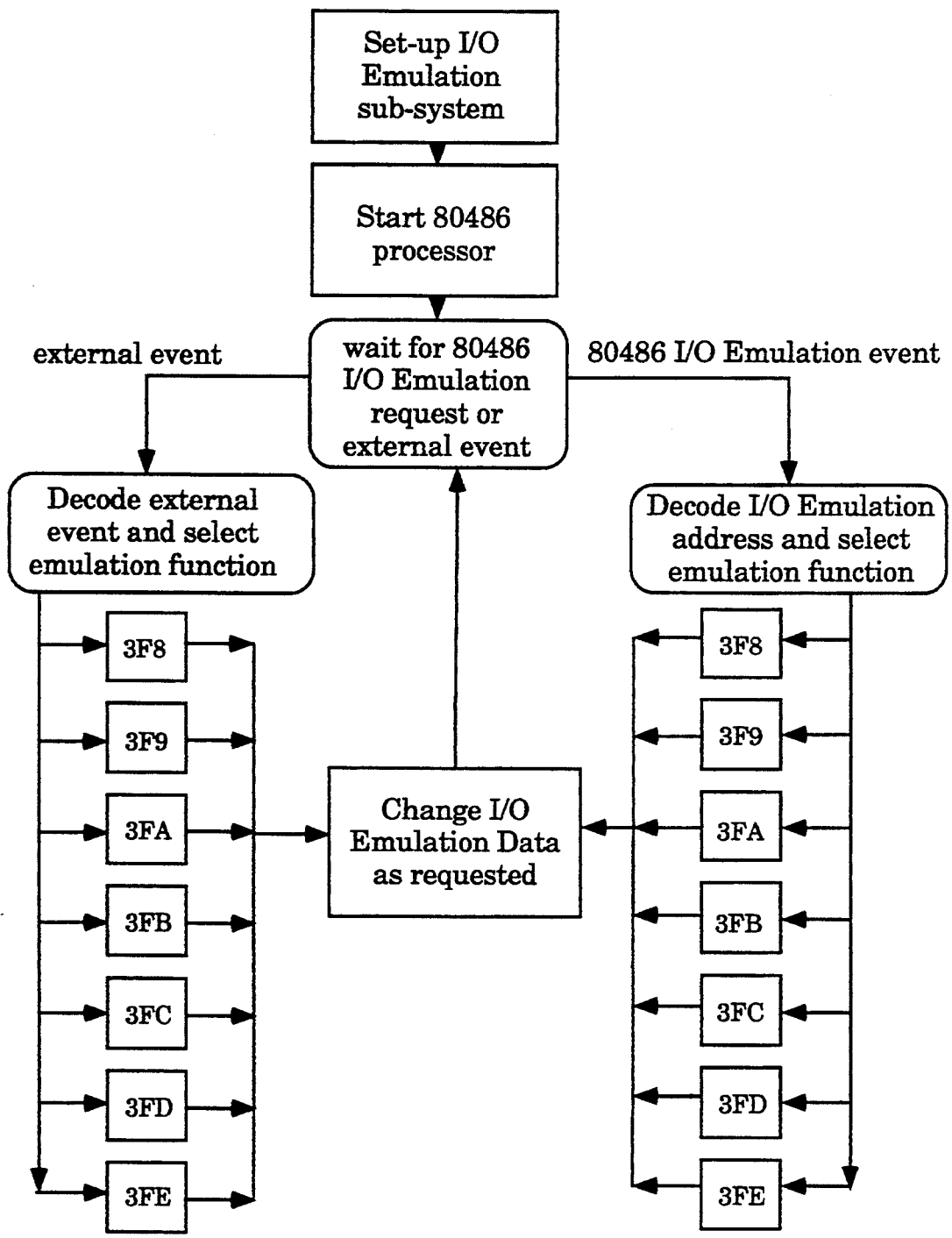
Figure 7C:
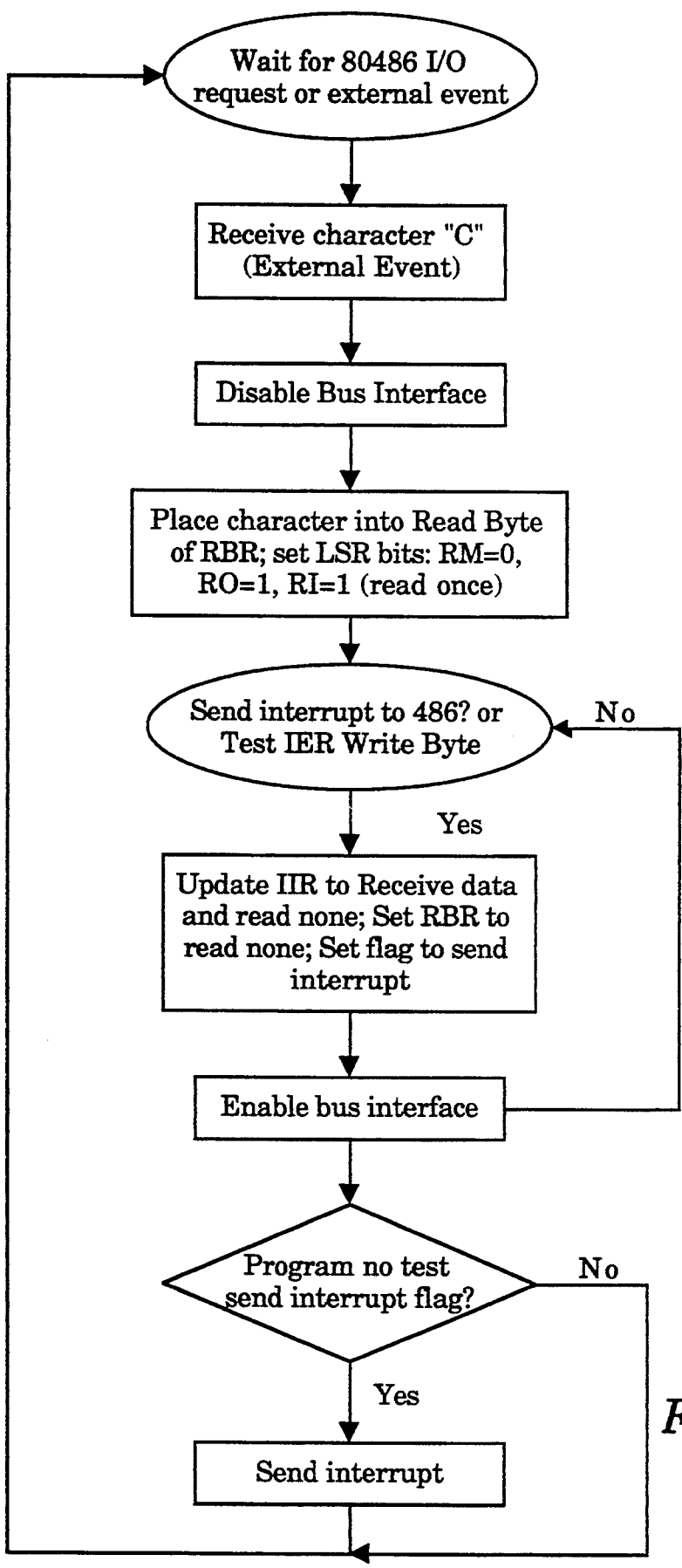

FIG. 7a, 7b, and 7c illustrate another example for the emulation of an IBM-PC/AT ® serial communications device using the IBM-PC/AT technical reference "Personal Computer Hardware Reference Library", chapter 2, "Asynchronous Communications Adapter", 1st Ed., August 1981. The communication or COM port emulation assumes that the comport emulation is connecting up to an external serial communications device. The external device may be either a pseudo or a real device. In the present example the emulated communications device is an IMS 8250 manufactured by LSI Logic Corporation, Milipitas, Calif. The following registers of the communications device are emulated:

| Address | Register |
| --- | --- |
| 3F8 | Tx Buffer [write when DLAB = 0] |
| 3F8 | Rx Buffer read when DLAB = 0] |
| 3F8 | Divisor Latch (LSB) [when DLAB = 1] |
| 3F9 | Divisor Latch (MSB) [when DLAB = 1] |
| 3F9 | Interrupt Enable Register [when DLAB = 0] |
| 3FA | Interrupt Identification Register |
| 3FB | Line Control Register |
| 3FC | Modem Control Register |
| 3FD | Line Status Register |
| 3FE | Modem Status Register |

The DLA bit is bit 7 of the line control register (LCR). FIG. 7a illustrates the process flow for emulating the COMport. FIG. 7b illustrates the initial states of the status words of the various registers. As the line control register is used to index into other registers, this register must be set up to interrupt the emulation on every write so that emulation of 3FB (LCR) can switch the interface mechanism to read and write data for the index registers indexed 3F8 and 3F9 based on the DLAB bit. The initial data for this register is set to the initial state of the external serial communications device connected to the emulation with the exception of DLAB which is set according to the desired internal emulation state.

In the present illustration, the DLAB is set to 0 so that the initial state will represent the transmit and receive buffers as 3F8 and the interrupt enable register at address 3F9. The initial set up for the register 3F8 (transmit and receive buffers) is the RBS bit is set to 1, the Read Many bit is set and the Write Once bit is set. The data value of the Tx Buffer is set to Don't Care and the data of the Rx Buffer set to the data of the external communications device. This register functions as two different registers at the same address where the emulation must grab the data from every write to pass it on to the external communications device. The read data will be that received from the external communications device.

If DLAB is set to one, the state for this address is set to the state for the Devisor Latch (LSB). The initial setting for this register is Read Many (RM), Write Once (WO), the data is set to the appropriate value for the external communications device's current baud rate setting. For example, if the external communication device has a baud rate of 9,600, the value is set to 0C (Hex). The Write Once bit is set as whenever this register is written to, the external communication device must have it's baud rate setting changed to match the emulated device. The Read Many bit is set as the read to this register does not affect any other emulation state.

At address 3F9 is the Divisor Latch (MSB) when DLAB=1 or the Interrupt Enable Register (IER) when DLAB=0. The Divisor Latch maintains the same initial state as the Divisor Latch at 3F8. The initial setting for the IER register is Read Many, Write Many and Reads am equal to Writes (i.e., RBS=0). The data is equal to the initial master reset state of the emulated device. The Write Many bit is set even though it affects the behavior of the emulations since it only affects the emulation on external events, such as receiving data. When the external event is being processed, this register can be read to determine how the emulation should handle the event at that time.

The IIR Interrupt Identification Register at address 3FA is initially set to Read Many, Write Many and Reads do not equal to Writes (RBS=0). If the interrupt pending bit (IP) is set to one (no interrupt pending), a polling mode is simulated. When the IP bit equals 0, an interrupt is pending and the initial state for this register must be changed to Read None, Write Many and Reads not equal to Writes so that the microprocessor can be held off until the interrupt is serviced by the host processor to adjust the state based on the action to another address for the emulated device.

The initial state for the modem control register (MCR), address 3FC, is Read Many, Write None and Reads are equal to Writes. At address 3FD is the Line Status Register (LSR). This register indicates when characters are received. The initial state for this register is Read Many/Write None and Reads are not equal Writes. As some of the bits in this register are Read Only and a read to this register affects the state of some of the bits in this register and a read or write to this register does not affect any other register state, the initial data for this register is mapped to the state for the external communications device. At address 3FE is the modem status register which is initially set to Read Once/Write Many and Reads are not equal Writes.

FIG. 7c illustrates a simple flow chart for reading an incoming character from an external device which is received by the emulation software emulating the communication port. The application running on the 80486 is assumed to be in the polling mode, reading the LSR. Every time the 80486 reads the LSR, it tests the Data Ready (DR) bit to determine when a character comes in. Once a character comes in, the state I/O status word is set to Read Once, while the bus interface is disabled and the DR bit is set. Preferably the bus interface is disabled using the semaphore register.

On the next read of the LSR, the bus interface issues an interrupt to the emulation software running on the host computer, returns the read byte data with the DR bit set immediately to the 80486 and disables further reads from the LSR register until the emulation has had time to service the interrupt. Since the data is read already in the Read byte (RBR), the 80486 may read it at any time while the emulation software running on the host is updating its internal state. The emulation then updates the LSR register to indicate that a CPU read has been made while the data ready bit was set by setting the DR bit in the LSR read byte to zero, setting the state back to Read Many on the LSR register and clearing the interrupt state by enabling the interrupt. The application on the microprocessor reads the RBR data and returns to polling mode by reading the LSR register. The emulation software on the host, meanwhile, would be waiting for the next interrupt or external event.

While the invention has been described in conjunction with the preferred embodiment, it is evident that numerous alternatives, modifications, variations and uses will be apparent to those skilled in the art in light of the foregoing description.

We claim:

1. In a computer system comprising a host processor and memory coupled via a bus, a general purpose input-/output device emulator for interfacing a microprocessor to the computer system whereby the host processor provides the input/output device emulation for the microprocessor, said microprocessor comprising address, data and control signal lines, said microprocessor issuing Input/Output (I/O) requests to I/O addresses representing ports of emulated devices through the address and data lines, said input/output device emulator comprising:

an I/O status block comprising at least one I/O status word storage for storing at least one I/O status word, each I/O status word corresponding to at least one I/O address of an emulated device, each I/O status word storage comprising;

read data storage for storing read data provided by the host processor and provided to the microprocessor in response to an I/O read request to an I/O address of the emulated device, said read data storage being configured to provide read ahead buffering, write data storage for storing write data provided by the microprocessor pursuant to an I/O write request to an I/O address of the emulated device, said write data storage being configured to provide write ahead buffering, and status bit storage for storing a plurality of status bits which indicate the status of the read data and write data respectively stored in the read data storage and write data storage of the I/O status word, said status bits being configured to indicate whether data can be read from the read data storage by the microprocessor, written to the write data storage by the microprocessor, and whether the host processor is to read the write data or write the read data and update the I/O status word of the I/O address of the emulated device, thereby providing the status bits for the read ahead and write behind buffering;

a bus interface coupled between the microprocessor and the bus comprising;

means for retrieving information output by the microprocessor across the address, data and control signal lines, said information identifying the I/O address, the type of I/O request and data, microprocessor control means for outputting control information to the microprocessor through the control signal lines, I/O status word retrieval means for translating the address of the device output by the microprocessor to the address of the corresponding I/O status word;

logic means for analyzing the I/O status word retrieved, such that if the status bits of the retrieved I/O status word indicate that the I/O operation requested can be performed, if the I/O request is an I/O read request, said bus interface being configured to provide the read data from the read data storage to the microprocessor across the data signal lines, if the I/O request is an I/O write request, said bus interface being constructed to store the data received from the microprocessor in the write data storage of the I/O status word, said logic means being constructed to indicate to the microprocessor that the I/O operation is complete, to review the status bits to determine whether to modify status bits to reflect the I/O operation performed, whether the host processor is to update the I/O status word;

if the host processor is to update the I/O status word, said logic means being constructed to indicate to the host processor that the host processor is to update the I/O status word;

said host processor upon receiving the indication from the bus interface being constructed to read the I/O status word, to review the status bits of the I/O status word and to update the I/O status word to reflect the state of emulation of the device;

whereby the microprocessor continues processing concurrently with the host processor updating the I/O status word of the address of the emulated device, thereby eliminating the lag time for the host processor to respond to an I/O request and increasing the speed of emulation.

2. The input/output device emulator as set forth in claim 1, wherein said status bit storage comprises storage for status bits including a read enable (RE) bit, a read many (RM) bit, a read once (RO) bit, a read interrupt (RI) bit, a write enable (WE) bit, a write many (WM) bit, a write once (WO) bit, and a write interrupt (WI) bit, wherein:

said logic means being constructed to analyze said read enable (RE) bit, which when set, permits read operations to occur;

said logic means being constructed to analyze said read many (RM) bit, which when set, permits unlimited read operations to occur;

said logic means being constructed to analyze said read once (RO) bit, which when set, permits one read operation to occur;

said logic means being constructed to analyze said read interrupt (RI) bit, which when set, causes an interrupt to be generated at the host processor when a read operation is performed;

said logic means being constructed to analyze said write enable (WE) bit, which when set, permits write operations to occur;

said logic means being constructed to analyze a write many (WM) bit, which when set, permits unlimited write operations to occur;

said logic means being constructed to analyze said write once (WO) bit, which when set, permits one write operation to occur; and said logic means being constructed to analyze said write interrupt (WI) bit, which when set, generates an interrupt at the host processor when a write operation occurs.

3. The input/output device emulator as set forth in claim 1, wherein said bus interface further comprises storage for a plurality of status bits, said status bits comprising a global read enable bit (GRE) and global write enable bit (GWE), said logic means being constructed to prevent read operations from occurring subsequent to the resetting of the global read enable bit and to prevent subsequent write operations from occurring subsequent to resetting the global write enable bit.

4. The input/output device emulator as set forth in claim 2, wherein said status bit storage comprises storage for status bits in said I/O status word further comprising a no read after write (NRAW) status bit, a global no read after write (GNRW) bit and a global write once (GWO) bit, wherein:

said logic means being constructed to analyze said no read after write (NRAW) status bit, which when set, prevents subsequent read operations from occurring after a write operation, said logic means in said bus interface resetting the RE bit;

said logic means being constructed to analyze said global no read after write (GNRW) bit, which when set, causes the GRE bit in the bus interface to be reset on a write operation thereby preventing subsequent reads from any I/O port from occurring;

said logic means being constructed to analyze said global write once (GWO) bit, which when set, causes the logic means to reset the GWE bit in the bus interface after a write operation thereby preventing subsequent write operations to any I/O port from occurring.

5. The input/output emulation device as set forth in claim 1, wherein said bus interface further comprises a data error register and a run/trap status bit for allowing the microprocessor to complete the I/O request when the I/O status bits indicate the I/O request can not be performed, said bus interface being constructed such that when said run/trap status bit is set, said bus interface provides the data stored in the data error register to the microprocessor in response to a read operation.

6. The input/output device emulator as set forth in claim 1, wherein said control information output by the microprocessor control means comprises a ready signal (RDY) and back-off signal (BOFF), said ready signal indicating that the bus cycle is complete and said BOFF signal indicating that the bus cycle is to be aborted by the microprocessor.

7. The input/output emulator device as set forth in claim 6, wherein said microprocessor being constructed to retry the aborted cycle after the BOFF signal is de-asserted.

8. The input/output device emulator device as set forth in claim 1, wherein said means for retrieving information output by the microprocessor across the address, data and control signal lines comprises a plurality of latches for latching the information output by the microprocessor.

9. The input/output device emulator as set forth in claim 1, wherein said I/O status block storage is configured in the memory connected to the bus.

10. The input/output device emulator as set forth in claim 1, wherein said I/O status block storage is configured in a memory located on the bus interface.

11. The input/output device emulator as set forth in claim 1, wherein said bus interface further comprises an I/O interrupt register for storing a value indicative of the memory region where the I/O status word is located, said host processor being constructed to read the I/O interrupt register to determine the memory region to search for the I/O status word.

12. The input/output device emulator as set forth in claim 1, wherein said I/O status block further comprises storage for storing a first alternate I/O status word, each of said first alternate I/O status words comprising an input/output port address, said I/O word retrieval means being constructed to utilize said first alternate I/O status word to alias a first port address with a second port address in an indirect addressing format.

13. The input/output device emulator as set forth in claim 1, wherein said I/O status block further comprises storage for storing a second alternate I/O status word, said second alternate I/O status word having a virtual indirect format comprising a bus address of a device to be accessed, said I/O word retrieval means being constructed to utilize said second alternate I/O status word to access to a device coupled to the bus.

14. The input/output device emulator as set forth in claim 1, wherein said I/O status block further comprises storage for storing a third alternate I/O status word, said third alternate I/O status word having an index format comprising an I/O port address and index map, said I/O port address identifying a subsequent I/O status word comprising an index, said I/O word retrieval means being constructed to utilize said index and index map to identify the address of the I/O status word.

15. The input/output device emulator as set forth in claim 1, wherein said logic means is constructed to indicate to the host processor that the host processor is to update the I/O status word by causing an interrupt to be issued to the host processor.

16. The input/output device emulator as set forth in claim 15, wherein said I/O status word storage further comprises an interrupt pending (IP) bit, which when set, indicates that an interrupt is pending in the host processor which relates to the update of the I/O status word having the IP bit set.

17. In a computer system comprising a host processor and a memory coupled via a bus, a process for providing a general purpose input output device emulation for interfacing a microprocessor to the computer system whereby the host processor provides the input output device emulation for the microprocessor, said microprocessor comprising address, data and control signal lines, said microprocessor issuing input output (I/O) request to I/O addresses representing ports of emulated devices through address and data lines, said I/O device emulation process comprising the steps of:

receiving an input/output (I/O) request issued by the microprocessor;

translating the I/O address output by the microprocessor to an address of a corresponding I/O status word;

providing an I/O status block comprising at least one I/O status word, each I/O status word corresponding to at least one I/O address of an emulated device, each I/O status word comprising;

read data storage, read data placed in said read data storage provided by the host processor and provided to the microprocessor in response to an I/O read request to an I/O address of a device, said read data storage being configured to provide read ahead buffering, write data storage, write data placed in said write data storage provided by the microprocessor pursuant to an I/O write request to an I/O address of a device, said write data storage being configured to provide write ahead buffering, and a plurality of status bits which indicate the status of the read data and write data respectively stored in the read data storage and write data storage of the I/O status word, said status bits indicating whether data can be read from the read data storage by the microprocessor, written to the write data storage by the microprocessor, and whether the host processor is to read the write data or write the read data and update the I/O status word of the I/O address of the emulated device, thereby providing the status bits for the read ahead and write behind buffering;

reading the I/O status word at the translated address;

analyzing the I/O status word read such that if the status bits of the retrieved I/O status word indicate that the I/O operation requested can be performed, if the I/O request is an I/O read request, providing read data storage to the microprocessor, and if the I/O request is an I/O write request, storing the data received from the microprocessor in the write data storage of the I/O status word, issuing a control signal to the microprocessor that the I/O operation is complete, reviewing the status bits in the I/O status word to determine whether to modify status bits to reflect the I/O operation performed, whether the host processor is to update the I/O status word;

if the host processor is to update the I/O status word, indicating to the host processor to update the I/O status word;

if the I/O request is an I/O read request, said host processor upon receiving an interrupt from the bus interface reads the data from the write byte, and if the I/O request is an I/O write request, said host processor reviews the status bits of the I/O status word and updates the I/O status word to reflect the state of emulation for the device;

whereby the microprocessor continues processing concurrently with the host processor updating the I/O status word of the address of the device thereby eliminating the lag time for the host processor to respond to an I/O request and increasing the speed of emulation.

18. In a computer system comprising a host processor and memory coupled via a bus, a general purpose input/output device emulator for interfacing a microprocessor to the computer system whereby the host processor provides the input/output device emulation for the microprocessor, said microprocessor comprising address, data and control signal lines, said microprocessor issuing Input/Output (I/O) requests to I/O addresses representing ports of emulated devices through the address and data lines, said input/output device emulator comprising:

an I/O status block comprising at least one I/O status word storage for storing at least one I/O status word, each I/O status word corresponding to at least one I/O address of an emulated device, each status word storage comprising;

read data storage for storing read data provided by the host processor and provided to the microprocessor in response to an I/O read request to an I/O address of a device, said read data storage being configured to provide read ahead buffering, write data storage for storing write data provided by the microprocessor pursuant to an I/O write request to an I/O address of a device, said write data storage being configured to provide write ahead buffering, and status bit storage for storing a plurality of status bits which indicate the status of the read data and write data respectively stored in the read data storage and write data storage of the I/O status word, said status bits being configured to indicate whether data can be read from the read data storage by the microprocessor, written to the write data storage by the microprocessor, and whether the host processor is to read the write data or write the read data and update the I/O status word of the I/O address of the emulated device, thereby providing the status bits for the read ahead and write behind buffering;

a bus interface coupled between the microprocessor and the bus comprising;

means for retrieving information output by the microprocessor across the address, data and control signal lines, said information identifying the I/O address, the type of I/O request and data, microprocessor control means for outputting control information to the microprocessor through the control signal lines, I/O status word retrieval means for translating the address of the device output by the microprocessor to the address of the corresponding I/O status word;

logic means for analyzing the I/O status word retrieved, such that if the status bits of the retrieved I/O status word indicate that the I/O operation requested can be performed, if the I/O request is an I/O read request, said bus interface being configured to provide the read data from the read data storage to the microprocessor across the data signal lines, if the I/O request is an I/O write request, said bus interface being constructed to store the data received from the microprocessor in the write data storage of the I/O status word, said logic means being constructed to indicate to the microprocessor that the I/O operation is complete, to review the status bits to determine whether to modify status bits to reflect the I/O operation performed, whether the host processor is to update the state of emulation and the I/O status word;

if the host processor is to update the I/O status word and the state of emulation, said logic means being constructed to indicate to the host processor that the host processor is to update the I/O status word;

said host processor maintaining the state of emulation for each I/O of each device emulated, said host processor upon receiving the indication from the bus interface being constructed to read the I/O status word, to review the status bits of the I/O status word and to update the state of emulation and the I/O status word to reflect the state of emulation of the device;

whereby the microprocessor continues processing concurrently with the host processor updating the state of emulation of the I/O device and of the I/O status word of the address of the emulated device, thereby eliminating the lag time for the host processor to respond to an I/O request and increasing the speed of emulation.

* * * * *